US009207920B2

(12) United States Patent
O'Boyle et al.

(10) Patent No.: US 9,207,920 B2
(45) Date of Patent: Dec. 8, 2015

(54) SYSTEMS AND METHODS FOR REMOTE ANALYSIS OF SOFTWARE APPLICATIONS

(71) Applicant: Veracode, Inc., Burlington, MA (US)

(72) Inventors: Ryan O'Boyle, Burlington, MA (US); John Mcenerney, Burlington, MA (US); Christien Rioux, Somerville, MA (US)

(73) Assignee: Veracode, Inc., Burlington, MA (US)

( * ) Notice: Subject to any disclaimer, the term of this patent is extended or adjusted under 35 U.S.C. 154(b) by 0 days.

(21) Appl. No.: 14/292,163

(22) Filed: May 30, 2014

(65) Prior Publication Data
US 2014/0359588 A1     Dec. 4, 2014

Related U.S. Application Data

(60) Provisional application No. 61/828,949, filed on May 30, 2013.

(51) Int. Cl.
*G06F 9/45* (2006.01)
*G06F 11/36* (2006.01)

(52) U.S. Cl.
CPC ....... *G06F 8/427* (2013.01); *G06F 8/53* (2013.01); *G06F 11/366* (2013.01); *G06F 11/3628* (2013.01); *G06F 11/3664* (2013.01)

(58) Field of Classification Search
CPC ............................................... G06F 8/40–8/54
USPC ................................................. 717/123–167
See application file for complete search history.

(56) References Cited

U.S. PATENT DOCUMENTS

| | | | | |
|---|---|---|---|---|
| 4,860,203 A * | 8/1989 | Corrigan et al. | ............... | 717/123 |
| 7,103,876 B1 * | 9/2006 | Lopez et al. | .................. | 717/127 |
| 7,293,213 B1 * | 11/2007 | Xiao et al. | ..................... | 714/741 |
| 8,407,675 B1 * | 3/2013 | Clark | ............................. | 717/131 |
| 2007/0168742 A1 * | 7/2007 | Wadsworth et al. | ............ | 714/38 |
| 2008/0120604 A1 | 5/2008 | Morris | | |
| 2009/0144698 A1 * | 6/2009 | Fanning et al. | ............... | 717/120 |
| 2010/0058301 A1 * | 3/2010 | Myles et al. | .................. | 717/142 |
| 2011/0078656 A1 | 3/2011 | Tsuta | | |

OTHER PUBLICATIONS

Khoshgoftaar, T.M.; Allen, E.B.; Xiaojing Yuan; Jones, W.D.; Hudepohl, J.P., "Assessing uncertain predictions of software quality," Software Metrics Symposium, 1999. Proceedings. Sixth International, pp. 159-168, 1999.*

(Continued)

*Primary Examiner* — Satish Rampuria
(74) *Attorney, Agent, or Firm* — Goodwin Procter LLP

(57) ABSTRACT

A system for testing a software application receives one or more object spaces extracted from a development or runtime environment of the software application. The extracted object space includes information about various objects associated with the software application, its dependencies, and/or environment, and some of the objects may be dynamically created and/or modified. The extracted object space does not include any source code. A language dependent extraction component can extract the object space using introspections and/or reflection APIs. The extracted object can be translated into a language-independent format and can be analyzed to identify any vulnerabilities in the software application without access to the source code, compiled binary, and runtime environment of the software application.

20 Claims, 6 Drawing Sheets

(56) References Cited

OTHER PUBLICATIONS

Xi Tan; Xin Peng; Sen Pan; Wenyun Zhao, "Assessing Software Quality by Program Clustering and Defect Prediction," Reverse Engineering (WCRE), 2011 18th Working Conference on, pp. 244-248, Oct. 17-20, 2011.*

Duncan, F.I.; Smeaton, A.G., "Assessing and improving software quality in safety critical systems by the application of a Software Test Maturity Model," System Safety, incorporating the Cyber Security Conference 2012, 7th IET International Conference on, pp. 1-4, Oct. 2012.*

Annex to Form PCT/ISA/206 Communication Relating to the Results of the Partial International Search for International Patent Application No. PCT/US2014/040309 mailed Sep. 18, 2014, (2 pages).

* cited by examiner

```
        module "ActiveRecord::Scoping::Default::ClassMethods"
        extend "ActiveSupport::Dependencies::ModuleConstMissing"
        extend "PP::ObjectMixin"
        extend "ActiveSupport::Dependencies::Loadable"
        extend "JSON::Ext::Generator::GeneratorMethods::Object"
        extend "Kernel"
        public_instance_method "unscoped" []
        == disasm:
<RubyVM::InstructionSequence:unscoped@C:/RailsInstaller/Ruby1.9.3/lib/ruby/gems/1.9.1/
gems/activerecord-3.2.8/lib/active_record/scoping/default.rb>
        == catch table
        | catch type: break  st: 0013 ed: 0026 sp: 0000 cont: 0026
        |----------------------------------------------------------------------
        0000 trace              8                                              ( 40)
        0002 trace              1                                              ( 41)
        0004 putnil
        0005 send               :block_given?, 0, nil, 8, <ic:0>
        0011 branchunless       28
        0013 putnil
        0014 send               :relation, 0, nil, 24, <ic:1>
        0020 send               :scoping, 0, block in unscoped, 0, <ic:2>
        0026 jump               37
        0028 trace              1
        0030 putnil
        0031 send               :relation, 0, nil, 24, <ic:3>
        0037 trace              16                                             ( 42)
        0039 leave                                                             ( 41)
        == disasm: <RubyVM::InstructionSequence:block in
unscoped@C:/RailsInstaller/Ruby1.9.3/lib/ruby/gems/1.9.1/gems/activerecord-
3.2.8/lib/active_record/scoping/default.rb>
        == catch table
        | catch type: redo  st: 0000 ed: 0005 sp: 0000 cont: 0000
        | catch type: next  st: 0000 ed: 0005 sp: 0000 cont: 0005
        |----------------------------------------------------------------------
        0000 trace              1                                              ( 41)
        0002 invokeblock        0, 0
        0005 leave
        == end disasm
        public_instance_method "before_remove_const" []
        == disasm:
<RubyVM::InstructionSequence:before_remove_const@C:/RailsInstaller/Ruby1.9.3/lib/ruby/
gems/1.9.1/gems/activerecord-3.2.8/lib/active_record/scoping/default.rb>
        0000 trace              8                                              ( 44)
        0002 trace              1                                              ( 45)
        0004 putnil
        0005 putself
        0006 putnil
        0007 setn               2
        0009 send               :current_scope=, 1, nil, 8, <ic:0>
        0015 pop
        0016 trace              16                                             ( 46)
        0018 leave                                                             ( 45)
        == end disasm
        end module
```

FIG. 3A

```
0004 putnil
0005 send            :block_given?, 0, nil, 8, <ic:0>
0011 branchunless    28
0013 putnil
0014 send            :relation, 0, nil, 24, <ic:1>
0020 send            :scoping, 0, block in unscoped, 0, <ic:2>
0026 jump            37
0030 putnil
0031 send            :relation, 0, nil, 24, <ic:3>
0039 leave
```

FIG. 3B

```
0004 putnil

PC = 0004
    Create a Ruby 'nil' value and push it on the stack 0005 send            :block_given?, 0, nil, 8, <ic:0>

PC = 0005
    Pop the value from the top of the stack into a temporary
    variable T0.
    Generate a SOM method call "T1 = T0.block_given()"
    Push a reference to variable T1 onto the top of the stack.

0011 branchunless    28

PC = 0011
    Pop the value from the top of the stack into T2;
    Generate a SOM conditional branch "if !T2 goto PC + 28"
...

0039 leave

PC = 0039
    Generate a SOM return statement "return T3"
```

FIG. 3C

```
unscoped()
{
    t0 = nil;
    t1 = t0.block_given?();
    t2 = t1;
    if (!t2) goto L39;
    ...
L39:
    return;
}
```

FIG. 3D

```
unscoped()
{
    if (block_given()) {
        ...
    }
    return;
}
```

FIG. 3E

SYSTEMS AND METHODS FOR REMOTE ANALYSIS OF SOFTWARE APPLICATIONS

CROSS-REFERENCE TO RELATED APPLICATION

This application claims priority to and benefit of U.S. Provisional Patent Application No. 61/828,949, entitled "Remote Analysis of Software Applications," filed on May 30, 2013, which is incorporated herein in its entirety.

FIELD OF THE INVENTION

This invention relates generally to systems and techniques for analyzing computer code, and more particularly to determining whether the computer code written using an interpreted programming language contains security flaws or is vulnerable to known security threats, without having access to the source code.

BACKGROUND

Generally, an interpreted computer programming language is a language that avoids the need for explicit program compilation. Conventional (compiled) programming languages are "compiled" into a set of machine-specific instructions before being saved as an executable file. The saved executable file is often referred to as a "binary" file. For interpreted languages, by contrast, the code is saved in the same format in which it was programmed by the developer. While compiled programs generally run faster than interpreted programs because they do not need to be reduced to machine instructions at runtime, an interpreted language permits functionality not generally available within compiled code. For example, interpreted programs can modify themselves by adding or changing functions at runtime, and testing programs written using an interpreted language may not require compilation prior to each test. Examples of interpreted programming languages include JavaScript, Perl, Python, and Ruby. Languages that are first compiled to bytecode (e.g., Java, C#, etc.) may not be considered as strictly interpreted languages because their source code is compiled into bytecode, which is then evaluated (interpreted) by a virtual machine (VM) or interpreter (e.g., Java VM, .NET Common Language Runtime (CLR)). The systems and methods described herein can be used, however, to extract information from such interpreted, bytecode runtimes, and an application program written in such a language can be analyzed using the extracted information.

However, there are risks in creating valuable application code using interpreted computer code. One risk, for example, is that the intellectual property associated with the code may be easily exploited or compromised if the code is distributed without ample protections. Furthermore, because the code can essentially "morph" during interpretation and create new classes and methods on the fly, debugging applications written using interpreted code can be difficult and can depend on the application's run-time environment and its interactions with other applications. Therefore, testing applications written primarily or exclusively using interpreted languages while maintaining the proprietary nature of the application code is challenging. Improved systems and methods are therefore needed to facilitate such testing.

SUMMARY

According to various embodiments of the invention, the methods and supporting systems described herein are used to analyze applications written using interpreted programming languages in the absence of source code, and without needing access to the application's run-time environment. This is achieved, in part, by providing a component that can be installed and executed in the application development/runtime environment to disassemble the software application, i.e., extract information about the application's and its development or runtime environment's internal structure and operations. The extracted information does not include the application source code. The disassembly, i.e., extracted information can be translated into a format suitable for static vulnerability analysis, to facilitate such analysis without access to the application source code, binary representation of the source code, and runtime environment.

Accordingly, in one aspect, a method is provided for assessing quality of a software program without having access to program source code or a corresponding compiled binary file. The method includes receiving an electronic recordation of an object space of the software program. The object space is extracted using an extraction component configured to extract the object space in a development or runtime environment of the program. The method also includes assessing quality of the software program using only the electronic recordation, within an environment that is not a runtime environment, and that is devoid of the program source code and any binary representation of the source code. In some embodiments, the extraction component is customized for a specific interpreted programming language corresponding to at least a portion of source code of the software program, i.e., at least a portion of the source code of the software program is written in that particular interpreted programming language. The object space may include one or more objects. Any of those objects can be a class, a class method, a constant, a name, a function argument, a function, a variable, and a class hierarchy. One or more objects in the object space may be created or modified during execution of the software program.

In some embodiments, the extraction of the object space using the extraction component includes loading core components of an interpreter of a language of the software application. A baseline object space may then be created using one or more application program interfaces (APIs). These APIs can be introspection APIs and/or reflection APIs. The method may further include loading a primary framework and dependencies thereof. One or more objects corresponding to the primary framework and/or the dependencies thereof may then be extracted, and the baseline object space may be updated based on the one or more extracted objects. In some embodiments, the method also includes loading any external dependencies specified in a configuration associated with the software program by invoking one or more calls of the primary framework. The baseline framework may be updated according to any objects extracted from the external dependencies.

In some embodiments, one or more software application units are initially loaded. A unit to be loaded can be a packaged dependency or a code component of the software application. The method may include at least partially executing the software application, and creating a final object space that includes one or more objects corresponding to the software application, i.e., corresponding to the loaded packaged dependencies and/or the loaded code components. In some embodiments, the method further includes identifying and loading one or more additional software application units, and at least partially executing the software application, after such additional units are loaded. The method may also include extracting at least one object corresponding to one or more of the initially loaded software application units and/or one or more of the additional software units. The final object space may be updated using the extracted one or more objects. An additional software application unit can include an additional dependency or a code component of the software application. In some embodiments, the method includes updating the final object space, and storing either one or both of the updated baseline object space and the updated final object space. Assessing the quality of the software program according to the method may include identifying potential security vulnerabilities of the program.

In another aspect, a method is provided for pre-processing one or more object spaces for analysis of each received object space. The method includes receiving an assembly-level representations of one or more object spaces, each of which includes one or more objects. The method also includes parsing the assembly-level representation of each object space. During parsing, each object in the corresponding object space is selected, e.g., in a sequence. The selected object may be translated into a syntax tree format, and an output including the syntax tree format representation of each object may be generated.

In some embodiments, translating the selected object into the syntax tree format includes determining if the selected object includes one or more methods. If the selected object is determined to include one or more methods, each of the one or more methods may be simulated so as to determine a sequence of operations corresponding to that method. The method may include translating the sequence of operations into the syntax tree format. Simulating any of the one or more methods may include simulating a bytecode associated with the method. In these embodiments, the selected object can be a module or a class.

In various embodiments, any of the one or more objects can be a module, a class, a procedure, or a variable. The object spaces may correspond to a software program, and the method may further include identifying any vulnerabilities in the software program by optimizing and analyzing the output corresponding to each translated object space.

In another aspect, a system is provided for testing a software application without access to any of source code, compiled binary, and development or runtime environment of the software application. The system includes a receiver (e.g., a memory, network interface, etc.) for receiving one or more object spaces. The object spaces may be extracted apart from the system by loading in a development or runtime environment of the software application: (i) a framework for executing the software application, (ii) at least a portion of the software application, and (iii) an extraction component configured to use an introspection application program interface (API) and/or a reflection API. The software application may be at least partially executed in the runtime environment so as to facilitate extraction of one or more object spaces. The system includes an analyzer for identifying any vulnerabilities in the software application using the received one or more object spaces. The analyzer is configured to operate in an environment that is devoid of the software application source code and any binary representation of the source code.

In some embodiments, the analyzer is configured to analyze input specified in a language-independent format, and the system further includes a translator configured for translating the one or more received object spaces into respective language-independent representations in the format that can be analyzed by the analyzer. The translator may include the receiver. The system may also include a generator for generating the extraction component such that the extraction component is dependent on the interpreted language in which at least a portion of the software application is written.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals generally refer to the same or similar elements. In different drawings, the same or similar elements may be referenced using different reference numerals. The drawings are not necessarily to scale, emphasis instead being placed upon illustrating aspects of the invention. In the drawings:

FIGS. 3A-3E depict examples of input, partial results, and output of the translation process depicted in FIG. 2.

DETAILED DESCRIPTION

Figure 1:
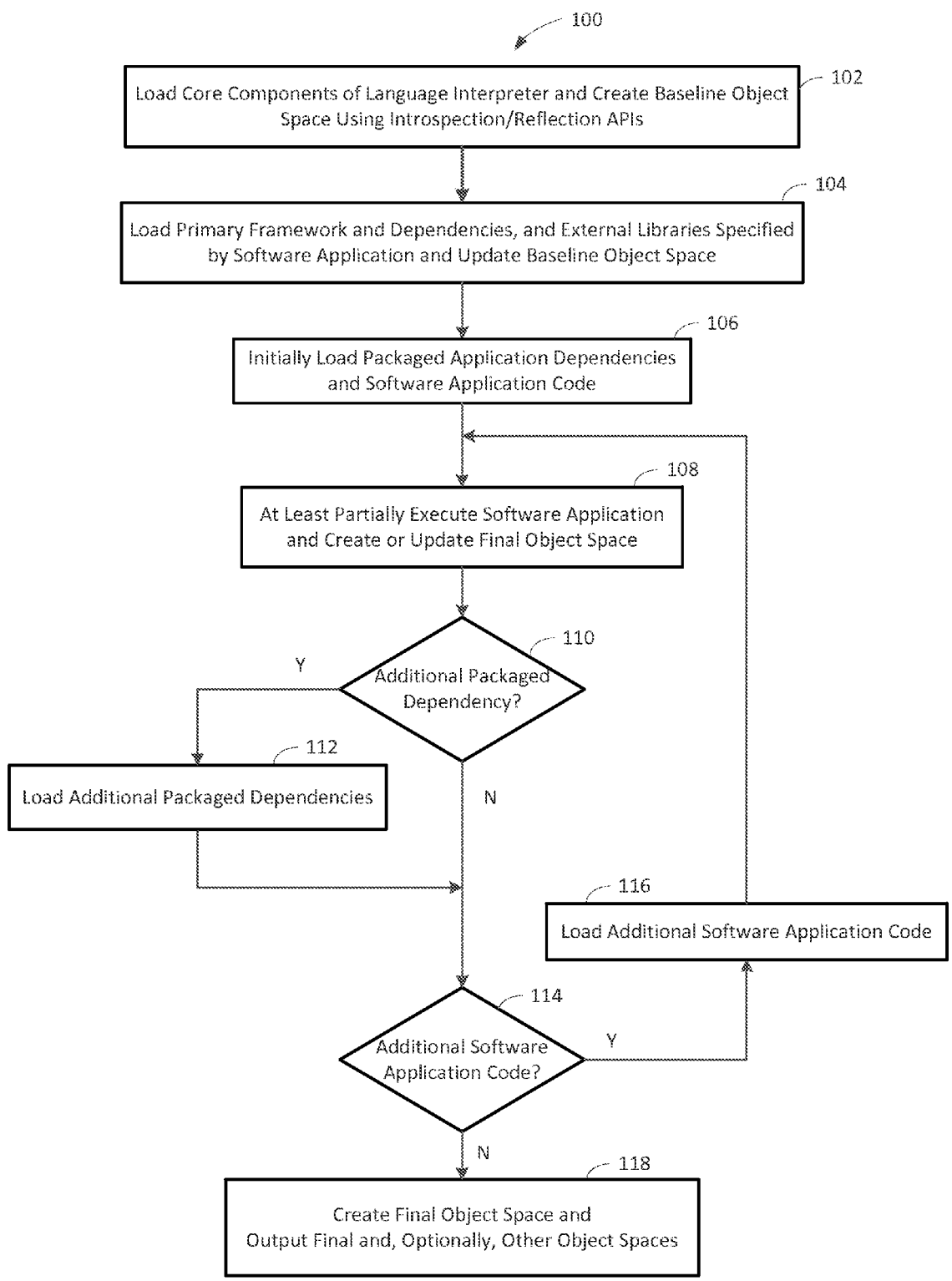
FIG. 1 illustrates a process of extracting information from a software application and environment thereof, according to one embodiment.

Examples of interpreted languages in which at least a part of the software application is executed as written in source code include Ruby, Perl, Python, JavaScript, and others. Generally, a static analysis is performed on a point-in-time view of the application's runtime state in an environment separate and apart from the environment in which the application is developed and deployed. In one particular example, introspection APIs may be used to access an internal class hierarchy, method instruction sequences, and other run-time details of a program after it has started up, defined its classes, modules, and methods, and compiled the template files into source code.

But because this approach requires the applications to execute, they must be prepared in an environment that provides all (or most) of the application's dependencies. In order to perform this function within the execution environment of the application to which the validation process will not have access, an extraction component, such as a "gem" for Ruby implementations, is created and sent to users such that they may prepare their application in such an environment and create the output needed for the validation and analysis phase. The extraction component includes scripts and libraries necessary to provide the user with the command-line functions to generate application snapshots within their environment. When the application is executed within the provided extraction component (e.g., gem framework, for Ruby applications), it creates an output file that does not include source code.

The extraction process may be executed at different stages of the build and execution of the application. For Ruby applications, for example, when initially running the Ruby interpreter, when loading the Ruby on Rails framework environment, and when the application source code is executed, etc. For Python applications, the extraction can be performed when initially running the Python interpreter, when loading libraries such as the Django web framework, and when executing a Python program, for example. The resulting file(s) contains list of every class existing at each point in run time, and for each class the extraction component captures each class method, each instance method, constants, names, arguments, functions, variables, and the entire class hierarchy along with the disassembly (instruction sequences, opcodes, bytecodes) for all method bodies which can be imported as if it were any other framework.

The file may then be sent to a third-party service for validation and analysis without the need for binary files or source code. Any vulnerabilities, errors, mistakes, poor programming practices or other issues that may lead to poor performance, security flaws, or other operational shortcomings may be identified and traced back to the class, method or other source in the file and communicated back to the application developer.

The extraction component that can extract information about the application and/or its environment can be incorporated into the development/runtime environment of a software application written at least in part using an interpreted language, and distributed to an application developer who wishes to scan (test) the application for any vulnerabilities (e.g., security vulnerabilities) therein. For example, a rubygem can be distributed to developers of Ruby on Rails applications, who wish to scan their applications to identify any security vulnerabilities in therein. The gem may include a command line tool and a supporting code library that can be used to create a disassembled version of a point-in-time, run-time state of their application. The developer may run the extraction component in a development environment and can send the resulting output to a third party for further analysis.

The resulting output includes, for static analysis, at least a disassembly of all modules and classes including instruction sequences for all application methods. For debug and other analysis purposes, the output may optionally include one or more of: a log of errors generated by the extraction component or other code in the development/runtime environment during disassembly; configuration files for the development/runtime environment (e.g., Rails, Bundler, or other common gems, for Ruby applications); a list of files included in the archive, i.e., a package sent to the third party for testing; and a recursive list of all files in the application directory (including those not contained in the archive).

With reference to FIG. 1, in the extraction process 100, an extraction component loads the core components of the interpreter of the language of the software application to be analyzed in step 102. Introspection and/or reflection application program interfaces (APIs) of the language in which the application is written are then used in step 102 to create a baseline copy of the object space of the current development/runtime environment of the application. The baseline copy generally includes language core and standard library classes and modules.

In step 104, the primary framework (e.g., Ruby on Rails, if the programming language is Ruby), and its dependencies are loaded. The extraction component can also invoke calls of the primary framework, e.g., to re-create framework initialization process including loading a number of additional dependencies, e.g., external libraries that may be specified, e.g., in one or more configuration files, and in the language/framework format (e.g., bundler's gemfile format for rubygems), in order to get run-time state ready for application launch. Thereafter, in step 104, the baseline object space is updated, e.g., to include any new objects introduced by the primary framework, its dependencies, and/or loaded external dependencies (libraries). After loading thereof, the primary framework, its dependencies, and/or external dependencies (libraries) can change one or more objects such as classes, modules, methods, etc. These changes can be captured while updating the baseline object space.

In step 106, the file structure of the software application is searched, and packaged application dependencies are loaded. One or more code components of the software application are also loaded in step 106. In step 108, the software application is at least partially executed, and the extraction component obtains a final copy of the object space using the introspective and/or reflective APIs based on any new object space information extracted using the APIs. The final copy may include classes and modules from the primary framework, its dependencies, any additional application dependencies, and from the loaded packaged libraries and software application components. The final copy may also capture any dynamic, runtime alterations (commonly called "monkey patches") from these libraries to the core and standard library classes and modules, and to the loaded software application components.

In step 110, the application's file structure is searched to identify any additional dependencies that may be packaged with the application. Often such packaged dependencies are not initially loaded in step 106, e.g., because dependencies that create these additional dependencies were not yet loaded. If any such dependencies are found, those are loaded in step 112. Alternatively or in addition, in step 114, relevant portion of the application's file structure is searched to identify any additional software application components, i.e., code supplied by the application developers. Similar to the packaged dependencies, the additional application components are not loaded in step 106 because components requiring these additional components themselves were not yet loaded in step 106. If any such dependencies and/or code is found and is loaded in step 112 and/or in step 116, the step 108 is repeated such that execution of the application can continue. The extraction component may update the final object space based on the objects extracted using the introspective and/or reflective APIs. The updated final object space may include additional objects (e.g., classes, modules, methods, etc.) from the packaged dependencies loaded in step 112 and/or additional components loaded in step 116. The updated final object space may also capture any dynamic runtime alterations from these additional dependencies and/or additional components. The steps 110-116 and 108 are repeated until no additional dependencies and no additional software application components are found and can be loaded.

In step 118, the extraction component may pre-compile custom, i.e., developer specified application templates, which can also be part of the software application source code, based on searching the application's file structure. The extraction component also takes a final introspective/reflective snapshot of the current object space. This snapshot may include the classes and modules defined by the custom (i.e., developer specified) software application code components, the dependencies loaded in steps 106, 112, and may capture any dynamic, run-time alterations ("monkey patches") to any of the previously loaded classes and modules.

Furthermore, in step 118, the extraction component iterates through all extracted classes and modules, optionally excluding those introduced to the runtime by the extraction component itself, in the most recent copy of the baseline object space that was generated in step 104, and archive such extracted classes and modules using a disassembly format. In general, the extraction component may capture one or more of the following objects: class/module name, superclass (indicating inheritance), included modules (mix-ins, e.g., if Ruby is the programming language), instance variables, singleton methods, constants, class variables, global variables, and methods, including argument details. The methods may include all method types (e.g., public methods, protected methods, and private methods, if Ruby is the programming language). The disassembly of all variables and constants may include type and value information if available. While iterating through the most recent baseline object space, instruction sequences of the various methods can be determined, but, typically, these instruction sequences are neither determined nor archived. In step 118, the extraction component also iterates through all extracted classes and modules, optionally excluding those introduced to the runtime by the extraction component itself, in the updated final object space generated in step 108 or in step 118, and optionally excluding those previously disassembled during step 108 and archive such extracted classes and modules using a disassembly format. While iterating in the updated final copy, the extraction component may extract the same objects as those extracted from the most recent copy of the baseline object space. In this instance, however, capture of methods includes complete instruction sequence disassembly. In step 118, details of any relevant database schema specified in the framework format may be evaluated and archived by the extraction component. Typically, the common framework format is an auto-generated file that describes a high level version of the tables and columns that can exist in the applications database, including data types.

Figure 2:
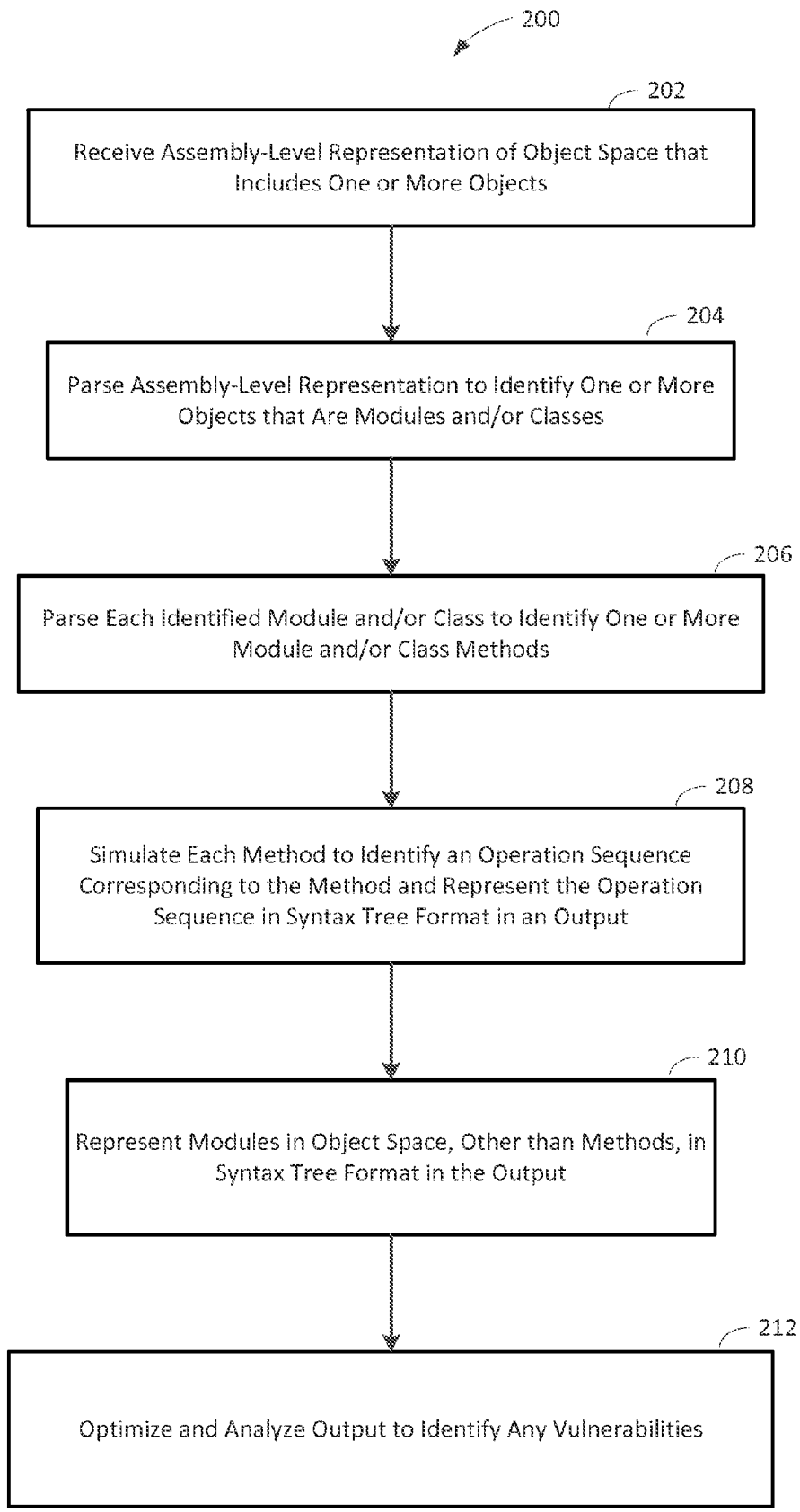
FIG. 2 illustrates a process of translating information extracted from a software application into a format suitable for analysis of the extracted information, according to one embodiment.

After an extraction component extracts and archives various objects in the object space associated with a software application to be scanned (tested), that archive can be analyzed using a static analyzer. In such analysis, the static analyzer does not need access to the software application source code or the development/runtime environment of the software application. The archived object space data may, however, need to be translated for use by the static analyzer, as described in a process 200 depicted in FIG. 2.

In step 202, assembly-level representation of the object space captured by an extraction component is received. FIG. 3A depicts an example of a representation of a software application written in Ruby. It should be understood, however, that assembly level representations of other interpreted programming languages such as Java, JavaScript, Python, etc., can also be received in step 202.

In step 204, the assembly-level representation is parsed using a translator component to identify objects that include methods, such as modules or classes. One or more of these identified objects is parsed in step 206, and for each parsed object, the corresponding methods are identified. Some objects may include only one method while other objects may include 2, 5, 10, or more methods. For example, for the assembly-level representation example shown in FIG. 3A, the translator component may identify module "ActiveRecord::Scoping::Default::ClassMethods," which contains methods "unscoped( )" and "before_remove_const( )." Each of these methods is implemented by a list of Ruby Virtual Machine (VM) operations ("bytecodes," in general). An example of a bytecode is depicted in FIG. 3B. It should be understood that methods of a software application written, at least in part, in Ruby can include Ruby VM operations, and that software applications written, at least in part, in other interpreted languages can include the corresponding operation representations or bytecodes.

In step 208, one or more identified methods are simulated, e.g., by processing the corresponding bytecodes one by one, and via such simulation, an operation sequence associated with each simulated method is identified. Specifically, during processing of each bytecode, certain aspects of the computer system that can interpret the software program, such as the operand stack and the program counter, are simulated to determine a corresponding operation to be represented as a syntax tree. FIG. 3C depicts an example of processing the bytecode depicted in FIG. 3B. The syntax tree format employed in the process depicted in FIG. 3C is in Scoped Object Model (SOM) format, but other formats of syntax trees are also contemplated. A syntax tree in the SOM format representing a sequence of operations corresponding to the bytecode depicted in FIG. 3B is depicted in FIG. 3D. In step 210, other objects from the object space that are not methods, such as modules, classes, procedures, and variables are also translated into a syntax tree representation.

In step 212, the syntax tree representation can be optimized. For example, the syntax tree depicted in FIG. 3D is optimized and represented as depicted in FIG. 3E. The optimized syntax tree can be analyzed by a static analyzer so as to identify any vulnerabilities in the software application, using only the syntax tree representation of the extracted object space, and without needing access to the source code or development/runtime environment of the software application.

Figure 4:
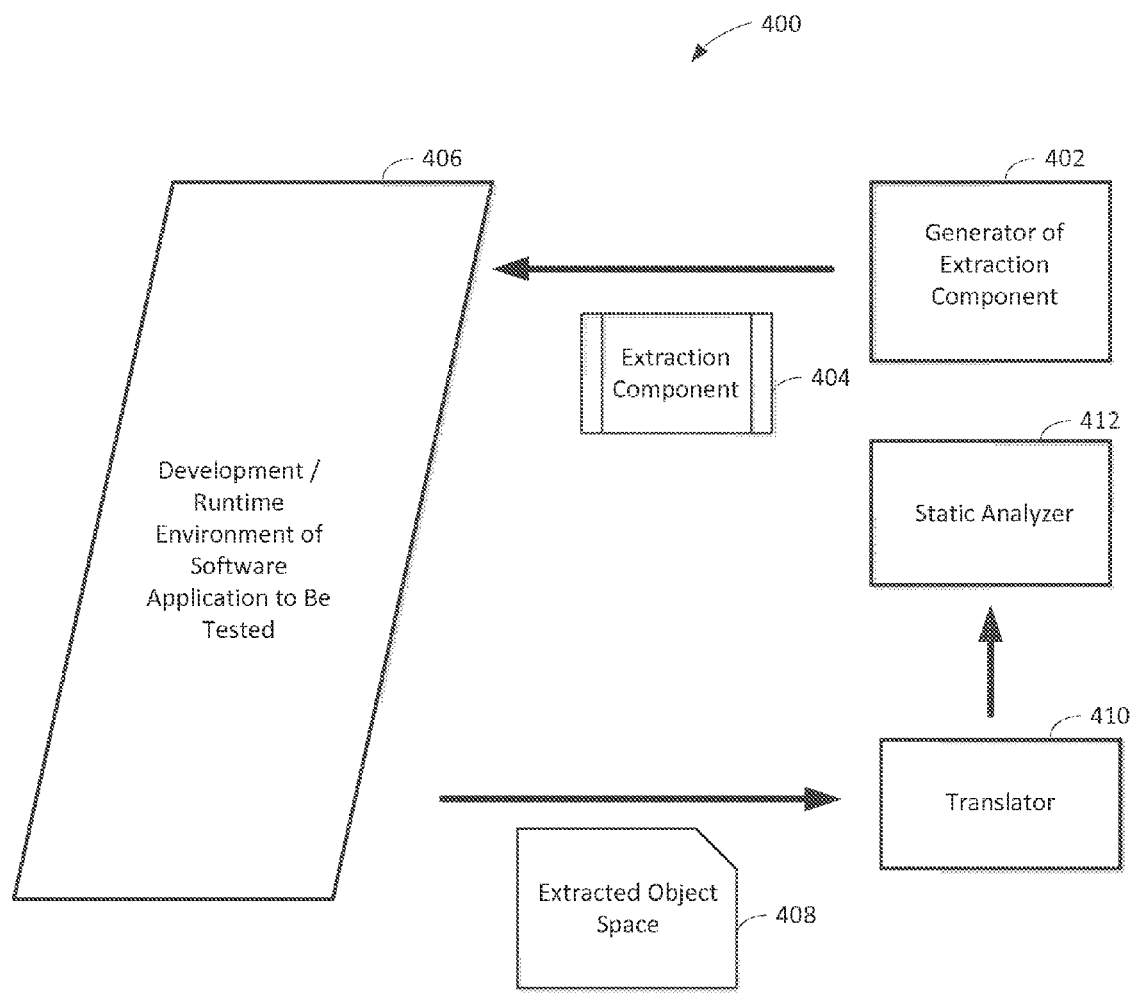
FIG. 4 schematically depicts a system for extracting and analyzing information from a software application and environment thereof, according to one embodiment.

With reference to FIG. 4, in a system 400, an extraction component generator 402 generates extraction components that are customized for interpreted languages such as Java, Ruby, Python, etc. Depending on an interpreted language in which at least a portion of the software application to be tested is written, a corresponding extraction component 404 is delivered to the development/runtime environment 406 of the software application. Using the extraction component, e.g., according to the process 100 described with reference to FIG. 1, object space 408 can be extracted. The extracted object space can include one or more of the baseline object space, updated baseline object space, final object space, and/or updated final object space, as described with reference to FIG. 1. A translator 410 then translates the extracted object space 408, e.g., according to the process 200 described with reference to FIGS. 2 and 3A-3E. The translated object spaces (e.g., translated updated baseline object space and translated updated final object space) may be represented in a syntax tree format, and can be analyzed using a static analyzer 412. The static analyzer 412 can detect any vulnerabilities in the software application without having access to the source code of the software application and the runtime environment thereof. Each of the generator 402, the translator 410, and the static analyzer 412 can be a customized computer system programmed using custom software to achieve the required functionality. One or more of the generator 402, the translator 410, and the static analyzer 412 can be implemented using a single computer system, or each of these can be implemented using different computer systems.

It is understood that the methods and systems described above may be implemented on various computing devices which may in turn contain software and hardware connected to the Internet via a network. Computing devices are capable of communicating with each other via the Internet, and it should be appreciated that the various functionalities of the components may be implemented on any number of devices.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A method of assessing quality of a software program, the method comprising the steps of:
    receiving in memory an electronic recordation of an object space of the software program, the object space:
        (i) being extracted using an extraction component that is dependent on an interpreted language in which at least a portion of the software application is written and that is configured to extract the object space in a development or runtime environment of the program, the extraction of the object space using the extraction component comprising: (A) loading core components of an interpreter of a language of the software application, and (B) creating a baseline object space using at least one application program interface (API), the API being an introspection API or a reflection API, and
        (ii) comprising at least one object defined by at least one of: (A) a developer specified software application code component, (B) a loaded dependency, and (C) a dynamic, run-time alterations to a previously loaded object; and
    within an environment devoid of the program source code and any binary representation of the source code, assessing, by a processor in communication with the memory, the quality of the software program using only the electronic recordation,
    wherein assessing the quality of the software program comprises identifying potential security vulnerabilities of the program, without having access to the program source code or a compiled binary file.

2. The method of claim 1, wherein the extraction component is customized for a specific interpreted programming language corresponding to at least a portion of source code of the software program.

3. The method of claim 1, wherein the object space comprises one or more objects, any object being selected from the group consisting of: a class, a class method, a constant, a name, a function argument, a function, a variable, and a class hierarchy.

4. The method of claim 3, wherein at least one object in the object space is created or modified during execution of the software program.

5. The method of claim 1, further comprising:
    loading a primary framework and dependencies thereof;
    extracting at least one object corresponding to the primary framework or the dependencies thereof; and
    updating the baseline object space based on one or more extracted objects.

6. The method of claim 5, further comprising loading any external dependencies specified in a configuration associated with the software program by invoking one or more calls of the primary framework.

7. The method of claim 5, further comprising initially loading one or more software application units, one of the one or more units being either a packaged dependency or a code component of the software application.

8. The method of claim 5, further comprising:
    at least partially executing the software application; and
    creating a final object space comprising at least one object corresponding to the software application.

9. The method of claim 8, further comprising:
    identifying and loading one or more additional software application units;
    at least partially executing the software application;
    extracting at least one object corresponding to at least one of the initially loaded software application units and the additional software units; and
    updating the final object space using the extracted at least one object.

10. The method of claim 9, further comprising:
    updating the final object space; and
    storing at least one of the updated baseline object space and the updated final object space.

11. The method of claim 9, wherein the one or more additional software application units comprise at least one of an additional dependency and a code component of the software application.

12. A system for testing a software application comprises:
    a receiver in communication with memory for receiving in the memory at least one object space comprising at least one object defined by at least one of: (A) a developer specified software application code component, (B) a loaded dependency, and (C) a dynamic, run-time alterations to a previously loaded object, the at least one object space being extracted using an extraction component that is dependent on an interpreted language in which at least a portion of the software application is written, by:
        loading in a development or runtime environment of the software application: (i) a framework for executing the software application, (ii) at least a portion of the software application, and (iii) an extraction component configured to use at least one of an introspection application program interface (API) and a reflection API; and
        at least partially executing the software application; and
    a processor configured as an analyzer and in communication with the memory, for identifying, without access to any of source code, compiled binary, and runtime environment of the software application, in an environment devoid of the software application source code and any binary representation of the source code, any vulnerabilities in the software application using the at least one received object space.

13. The system of claim 12, further comprising a translator that is implemented by the processor and that is configured for translating the at least one received object space into a language-independent representation, wherein the analyzer is configured to analyze input in a format of the language-independent representation.

14. The system of claim 12, further comprising a generator that is implemented by the processor, for generating the extraction component.

15. The system of claim 12, wherein the extraction component is configured for:
  receiving in memory an assembly-level representation of the object space comprising one or more objects;
  parsing by a processor in communication with the memory the assembly-level representation, selecting each object;
  translating by the processor the selected object into a syntax tree format; and
  generating by the processor an output comprising the syntax tree format representation of each object.

16. The system of claim 15, wherein translating the selected object into the syntax tree format comprises:
  determining if the selected object comprising one or more methods;
  if the selected object comprises one or more methods, simulating each of the one or more methods and determining a sequence of operations corresponding to that method; and
  translating the sequence of operations into the syntax tree format.

17. The system of claim 16, wherein the selected object is a module or a class.

18. The system of claim 16, wherein simulating at least one of the one or more methods comprises simulating a bytecode associated with the method.

19. The system of claim 15, wherein one of the one or more objects is selected from the group consisting of a module, a class, a procedure, and a variable.

20. The system of claim 15, wherein the object spaces corresponds to a software application.

* * * * *